US008171178B2

(12) United States Patent
Zwisler et al.

(10) Patent No.: US 8,171,178 B2
(45) Date of Patent: May 1, 2012

(54) SCALING OF SMALL COMPUTER SYSTEM INTERFACE INPUT OUTPUT (SCSI I/O) REFERRALS

(75) Inventors: Ross E. Zwisler, Lafayette, CO (US);
Andrew J. Spry, Wichita, KS (US);
Gerald J. Fredin, Wichita, KS (US);
Kenneth J. Gibson, Lafayette, CO (US)

(73) Assignee: LSI Corporation, Milpitas, CA (US)

( * ) Notice: Subject to any disclaimer, the term of this patent is extended or adjusted under 35 U.S.C. 154(b) by 365 days.

(21) Appl. No.: 12/553,558

(22) Filed: Sep. 3, 2009

(65) Prior Publication Data

US 2010/0153613 A1 Jun. 17, 2010

Related U.S. Application Data

(63) Continuation-in-part of application No. 12/316,713, filed on Dec. 15, 2008, and a continuation-in-part of application No. 12/316,778, filed on Dec. 15, 2008.

(60) Provisional application No. 61/215,304, filed on May 4, 2009.

(51) Int. Cl.
*G06F 3/00* (2006.01)

(52) U.S. Cl. ......... 710/5; 710/3; 710/7; 710/10; 710/15; 710/20

(58) Field of Classification Search .................. 710/3, 5, 710/7, 10, 15, 20, 33
See application file for complete search history.

(56) References Cited

U.S. PATENT DOCUMENTS

| 5,548,751 | A | 8/1996 | Ryu et al. |
| 7,215,676 | B2 * | 5/2007 | Lee ............................ 370/395.5 |
| 7,363,446 | B2 * | 4/2008 | Higaki et al. ................. 711/162 |
| 7,475,167 | B2 * | 1/2009 | Wunderlich et al. ............ 710/33 |
| 2002/0085564 | A1 * | 7/2002 | Lee ............................ 370/395.6 |
| 2007/0192554 | A1 * | 8/2007 | Higaki et al. ................. 711/162 |

FOREIGN PATENT DOCUMENTS

| EP | 0446940 A2 | 9/1991 |
| EP | 0971358 A2 | 1/2000 |
| EP | 1811378 A2 | 7/2007 |

* cited by examiner

*Primary Examiner* — Tariq Hafiz
*Assistant Examiner* — Jasjit Vidwan
(74) *Attorney, Agent, or Firm* — Suiter Swantz pc llo

(57) ABSTRACT

A command is issued to a first data storage system for addressing a set of data and at least one of a first referral response including a referral to at least a second data storage system or at least a first subset of the set of data and the first referral response including the referral to the at least the second data storage system. The at least one of a first referral response is accessed. A command is issued to the second data storage system for addressing the set of data and a second referral response including a referral to at least one of the first data storage system and a third data storage system, the second data storage system including at least a second subset of the set of data. The second subset of the set of data and the second referral response including the referral to the at least one of the first data storage system or the third data storage system is accessed.

7 Claims, 5 Drawing Sheets

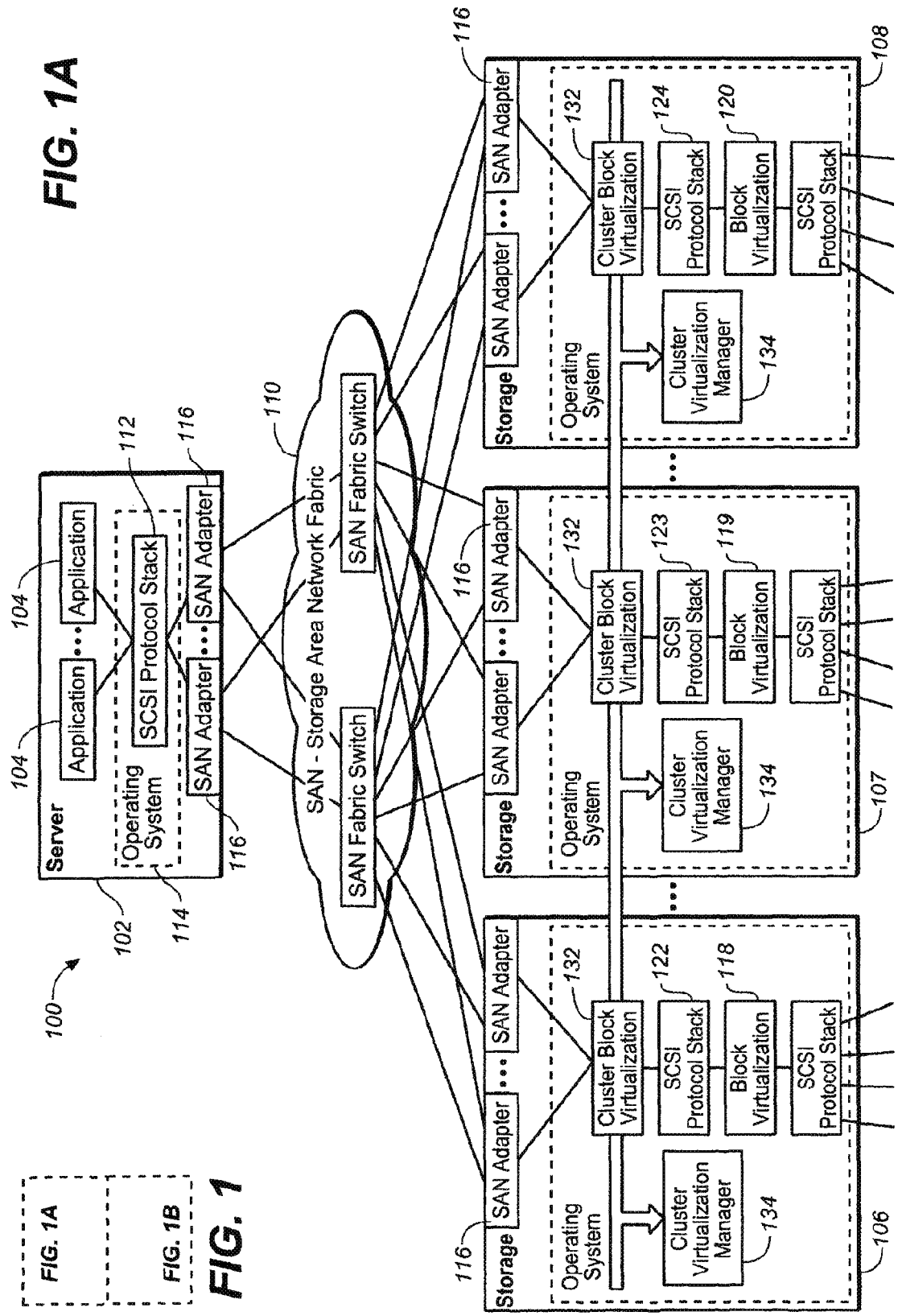

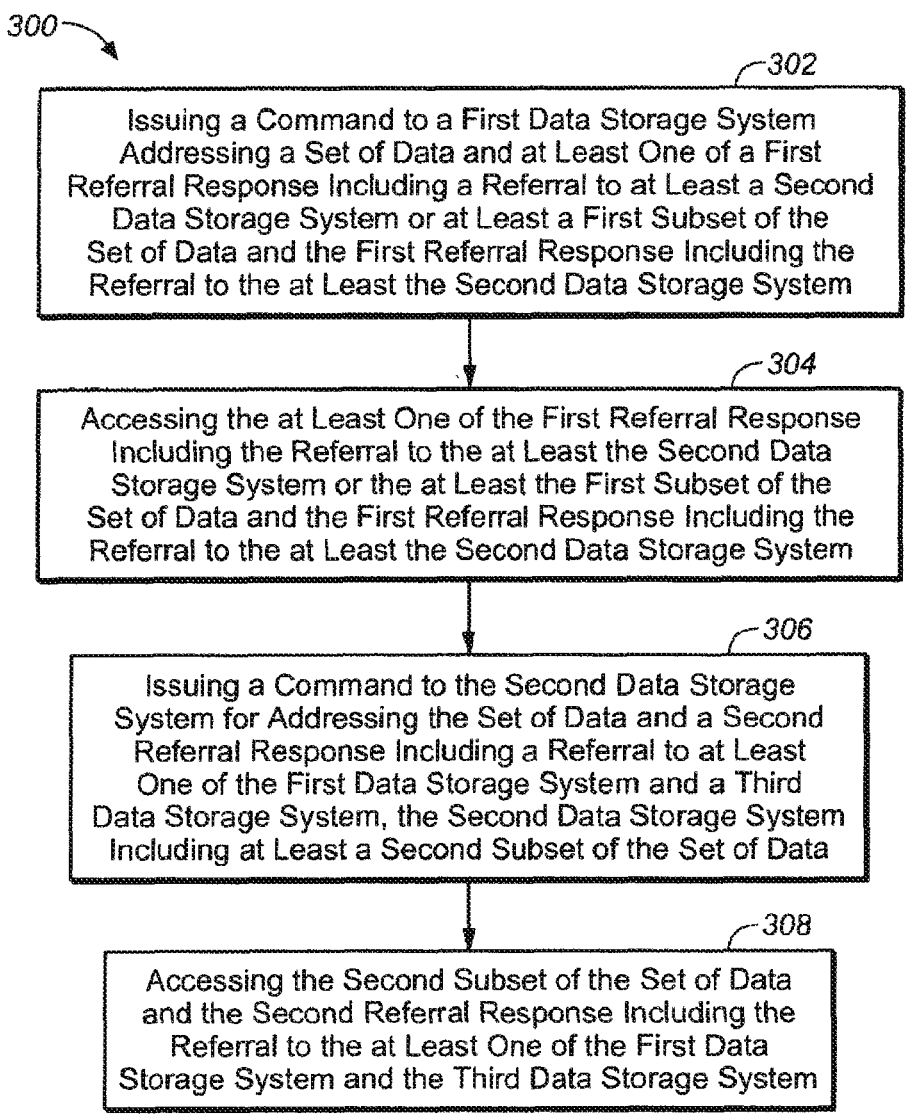

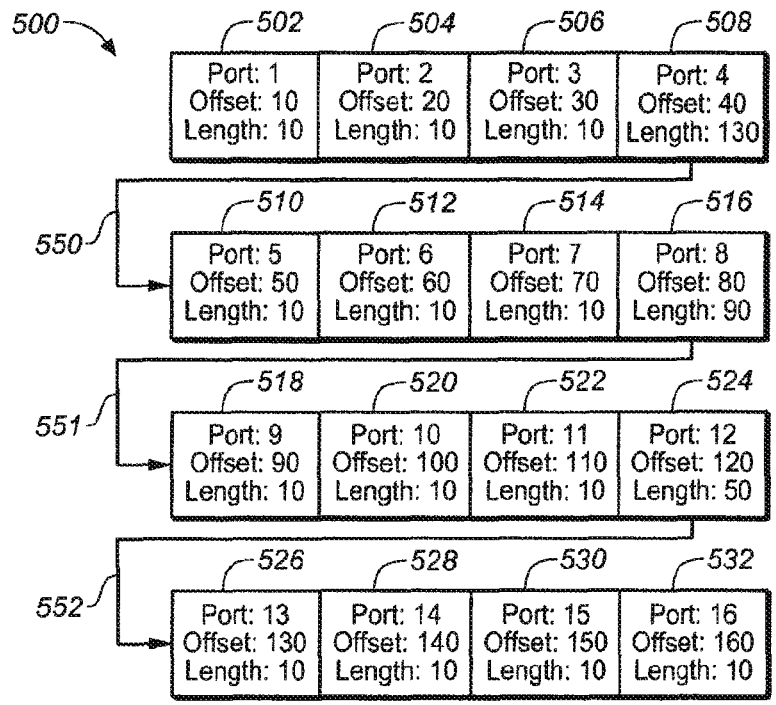
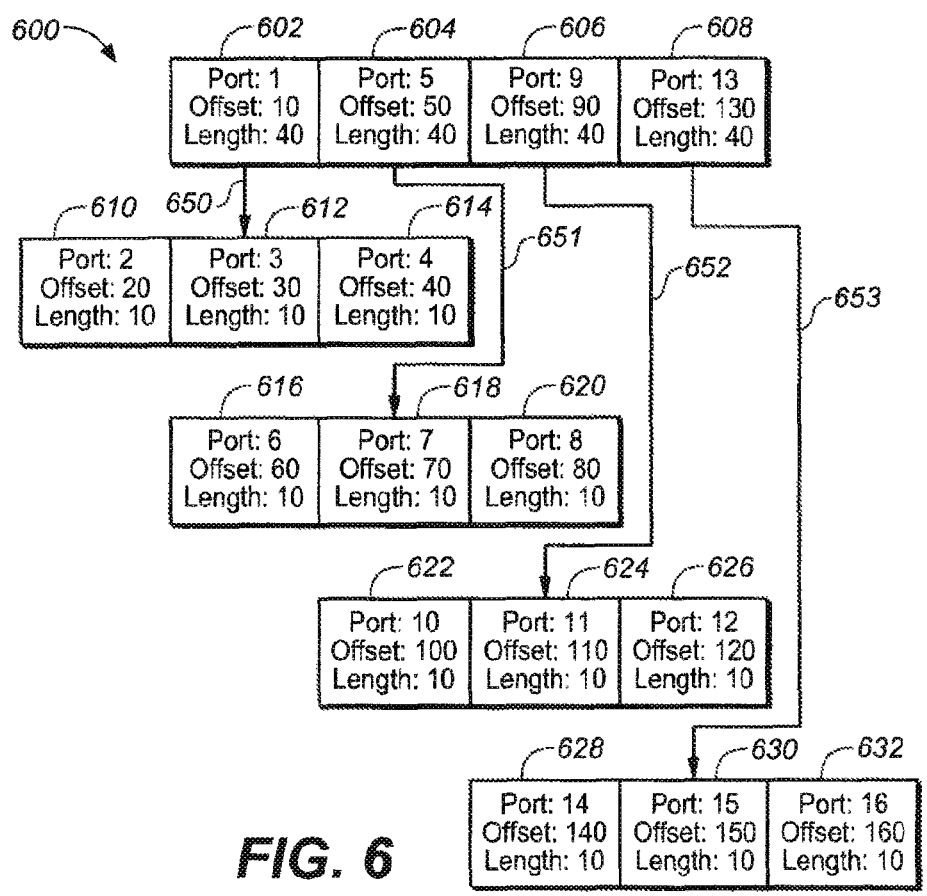
FIG. 5
FIG. 6

SCALING OF SMALL COMPUTER SYSTEM INTERFACE INPUT OUTPUT (SCSI I/O) REFERRALS

CROSS-REFERENCE TO RELATED APPLICATIONS

The present application claims priority under 35 U.S.C. §119(e) to U.S. Patent Application Ser. No. 61/215,304, filed May 4, 2009, entitled "SCALING OF SMALL COMPUTER SYSTEM INTERFACE INPUT OUTPUT (SCSI I/O) REFERRALS"; the present application is a continuation-in-part of U.S. patent application Ser. No. 12/316,713, filed Dec. 15, 2008, entitled "SMALL COMPUTER SYSTEM INTERFACE INPUT OUTPUT (SCSI I/O) REFERRAL"; the present application is a continuation-in-part of U.S. patent application Ser. No. 12/316,778, filed Dec. 15, 2008, entitled "MULTI-PATHING WITH SCSI I/O REFERRALS." All of the preceding Patent Applications are incorporated herein by reference.

TECHNICAL FIELD

The present disclosure generally relates to the field of networked storage, and more particularly to a system and method for providing an arbitrary number of Small Computer System Interface (SCSI) referrals between an initiator system and a number of ports in a block storage cluster.

BACKGROUND

Block storage clustering and networked storage may provide systems/methods for accessing data spanning multiple storage devices.

SUMMARY

A method includes, but is not limited to: issuing a command to a first data storage system for addressing a set of data and at least one of a first referral response including a referral to at least a second data storage system or a first subset of the set of data and the first referral response including the referral to the at least the second data storage system; accessing the at least one of the first referral response including the referral to the at least the second data storage system or the first subset of the set of data and the first referral response including the referral to the at least the second data storage system; issuing a command to the second data storage system for addressing the set of data and a second referral response including a referral to at least one of the first data storage system and a third data storage system, the second data storage system including at least a second subset of the set of data; and accessing the second subset of the set of data and the second referral response including the referral to the at least one of the first data storage system and the third data storage system.

A storage cluster includes, but is not limited to: a first data storage system for at least one of generating a first referral response or storing a first subset of a set of data and generating the first referral response; and a second data storage system for storing a second subset of the set of data and generating a second referral response; wherein the first referral response includes a referral to at least the second data storage system and the second referral response includes a referral to at least one of the first data storage system and a third data storage system.

A system includes, but is not limited to: means for issuing a command to a first data storage system for addressing a set of data and at least one of a first referral response including a referral to at least a second data storage system or a first subset of the set of data and the first referral response including the referral to the at least the second data storage system; means for accessing the at least one of the first referral response including the referral to the at least the second data storage system or the first subset of the set of data and the first referral response including the referral to the at least the second data storage system; means for issuing a command to the second data storage system for addressing the set of data and a second referral response including a referral to at least one of the first data storage system and a third data storage system, the second data storage system including at least a second subset of the set of data; and means for accessing the second subset of the set of data and the second referral response including the referral to the at least one of the first data storage system and the third data storage system.

It is to be understood that both the foregoing general description and the following detailed description are exemplary and explanatory only and are not necessarily restrictive of the present disclosure. The accompanying drawings, which are incorporated in and constitute a part of the specification, illustrate subject matter of the disclosure. Together, the descriptions and the drawings serve to explain the principles of the disclosure.

BRIEF DESCRIPTION OF THE DRAWINGS

The numerous advantages of the disclosure may be better understood by those skilled in the art by reference to the accompanying figures in which:

FIG. 3 is a flow chart illustrating a method for communication between an initiator system and a block storage cluster in accordance with the present disclosure;

FIG. 4 is a diagram of a SCSI referral list format in accordance with an embodiment of the present disclosure;

FIG. 5 is a block diagram illustrating a series of SCSI referrals for a linked referral list distribution; and FIG. 6 is a block diagram illustrating a series of SCSI referrals for a referral list tree distribution.

DETAILED DESCRIPTION

Reference will now be made in detail to the subject matter disclosed, which is illustrated in the accompanying drawings.

Figure 1B:
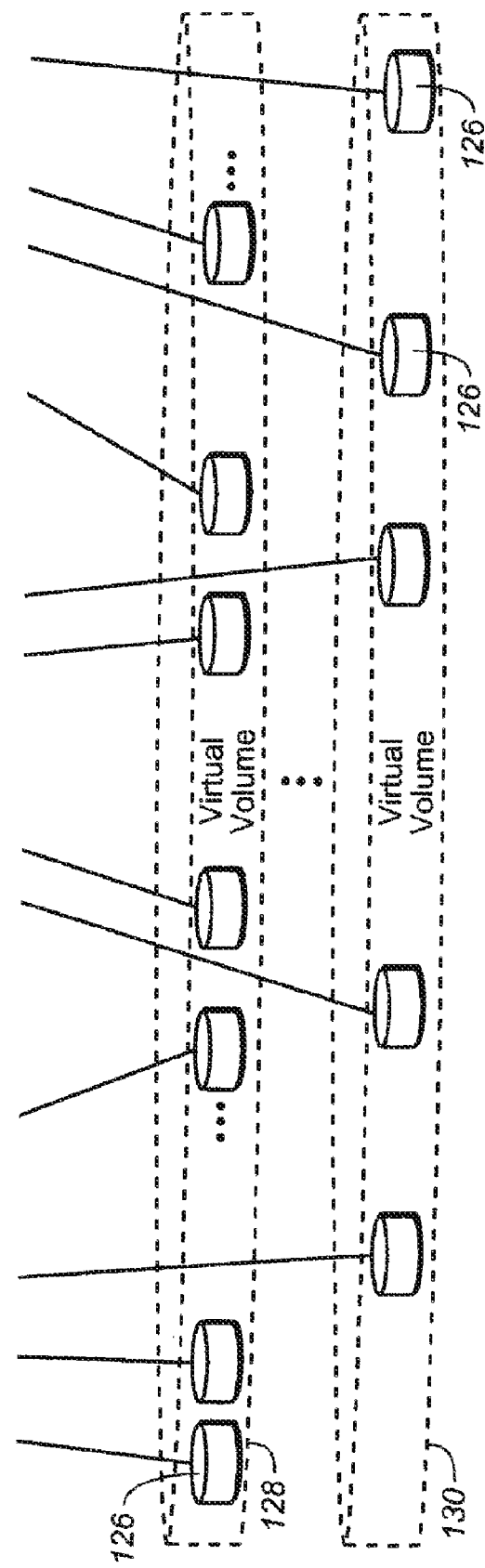
FIG. 1 is a block diagram of a networked storage implementation/system accessible via a block storage protocol in accordance with the present disclosure.

Referring generally to FIG. 1, a networked storage implementation/system accessible via a block storage protocol is shown. For example, the block storage protocol may be a Small Computer System Interface (SCSI) protocol implemented over a network capable media transport, such as Fibre Channel, iSCSI, or Serial Attached SCSI (SAS). The invention may further be implemented in other block storage protocols, such as SCSI RDMA Protocol (SRP). The system/method of the present invention extends the block storage protocol to allow for distribution of data with a common logical block address space across multiple, discrete, cooperating storage systems which form a block storage cluster.

The networked storage implementation/system/storage infrastructure 100 may include an application system/server 102. The application system 102 may run one or more applications 104. The applications 104 running on the application system 102 may access storage resources stored on one or more storage systems (106-108) across/via/using a network (ex.—a storage area network (SAN) 110). The applications may use a block storage protocol stack (ex.—a Small Computer System Interface (SCSI) protocol stack) 112 of an operating system 114 of the server (without loss of generalization) to access the storage resources/network storage resources. The operating system 114 of the server 102 may be directly running on server hardware or may run within a virtual machine in a virtualized environment without loss of generality.

In current embodiments of the present invention, the SCSI protocol stack 112 of the server 102 may present local (ex.—on the server) or remote (ex.—on the network) storage resources to the applications 104 as block storage devices/logical units/SCSI logical units. Each logical unit/SCSI logical unit may have a unique logical block address space. The remote storage resources/remote storage devices (106-108) may be accessed by one or more SAN adapters 116 of the server 102 and/or storage systems (106-108), which may run a network media transport protocol over which block storage protocol is mapped. For example, SCSI protocol may be mapped over various types of implementable network transports. Without loss of generalization, the SAN adapters 116 and their media transport protocol layer may be physical or virtual network adapters.

In exemplary embodiments of the present invention, the storage area network 110 may be implemented from any network media and transport protocol that allows port level addressing (ex.—Fibre Channel, EtherNet, InfiniBand, and Serial Attached SCSI (SAS)). Media transport layer protocols may handle all routing of protocol packets from end-point to end-point ports across network fabric 110. Without loss of generality, the network 110 may be implemented as a single fabric or multiple redundant fabrics. Preferably, network ports on the application system(s)/server(s) 102 are able to physically reach network ports on the storage system(s) (106-108).

In further embodiments of the present invention, the storage system(s) (106-108) may be a networked attached storage device(s). For instance, the storage systems (106-108) may be general purpose computers, dedicated storage arrays or networked disk drives which make their local devices visible on the SAN 110. Storage resources of the storage system may be accessed via SAN ports which are running the media transport protocol layer. The SCSI layer may use said SAN ports to communicate with the storage network as storage ports. Each storage system 106-108 may include a local block virtualization layer (118-120) which may apply data protection or block abstraction to its physical storage devices. For example, data protection such as Redundant Array of Inexpensive Disks (RAID) may be used on dedicated network storage systems. Each storage system 106-108 may further include an internal block protocol stack (122-124) which may access the actual attached physical storage devices 126 which it exports to the network 110.

The amount of storage available to application servers/application systems/servers 102 may be extended by adding more storage devices 126 to individual storage systems (106-108), or by adding additional storage systems (106-108) to the storage area network. When additional storage devices 126 are added to the individual storage systems (106-108), the local block virtualization layers (118-120) in the storage systems (106-108) may be used by the cluster block virtualization layer (132) to create larger virtual volumes (128, 130) across multiple storage systems (106-108) from multiple physical disks (126). This may preserve the single logical block address space of virtual volumes (128, 130), but, at some point, the number of physical attachment points on the individual storage system(s) (106-108) may be exhausted, thus providing a limitation on total capacity expansion. When storage systems are added to the storage area network, the total storage available to applications may be increased beyond the physical limits of a single storage system. However, storage provided by multiple storage systems (106-108) may need to be combined into a common logical block address space for use by application server(s) (102).

A number of techniques may be utilized for creating a single name space/common logical block address space from storage resources 126 on multiple network attached storage systems (106-108). For example, said techniques may use different storage protocols, such as clustered file systems or object storage protocols. Block storage cluster aggregation may be added to the storage network 110, such that block cluster aggregation may be provided by a cluster block virtualization device in each of a plurality of redundant SAN fabrics 110. The cluster block virtualization device may sit between a network storage system(s) and an application system(s). The cluster block virtualization device may import block storage logical units exported by the network storage systems/storage systems, and may create an additional layer of block virtualization by creating virtual volumes. The cluster block virtualization device may then export the virtual volumes as logical units to the application system(s). The application system does not see or access the logical units exported by the storage system, but rather, only sees the virtual volumes/cluster virtual volumes. The cluster physical structure discovery, virtualization mapping, and management may be provided by a cluster virtualization manager. The cluster virtualization manager may reside on a separate pair of redundant devices anywhere in or on the edge of the SAN. Without loss of generalization, the block storage cluster aggregation function may be distributed across the cluster block virtualization devices/block cluster virtualization devices.

Alternatively, block storage cluster aggregation/block cluster aggregation may be added to application system(s) 102 (application system aggregation). For example, block cluster aggregation may be provided by an additional abstraction layer added to the application system's block storage protocol stack. Numerous options may be implemented for placing said abstraction layer on the application system. The block virtualization layer may mask or hide logical units exported by the storage system(s) and may present virtual volumes to layers above the block virtualization layer in the block storage protocol stack. Unlike when block storage cluster aggregation is added to the storage area network (network aggregation), when adding block storage cluster aggregation to application systems, logical units exported by the storage system(s) are accessible to application system(s)/server(s). The block virtualization layer may hide access to said logical units from applications running on the application system(s)/server(s). Like network aggregation, when block cluster aggregation is added to the application system(s), a cluster virtualization manager function may be present for discovering storage resources in the cluster and for distributing virtualization mapping across the application server(s). One variation of this management approach may include having separate cluster virtualization configuration in each server, which may prevent virtual volumes from being shared across application servers. Alternatively, to provide sharing of the virtual volumes, a cluster-wide virtualization manager may be required.

In the illustrated embodiment of the present invention (as shown in FIG. 1), block storage cluster aggregation may be added to the storage system(s) (106-108) (storage system aggregation). The block cluster aggregation may be provided by a cluster block virtualization layer(s) 132 added to the block protocol stacks (122-124) of at least one of storage systems (106-108). The cluster block virtualization layer 132 may combine storage devices 126 on local and remote storage systems into virtual volumes (128, 130). The storage devices 126 on each storage system (106-108) in the cluster are detectable by/visible to one or more of the other storage systems (ex.—the storage devices of storage system 106 are visible to storage system(s) 107 and 108, the storage devices of storage system 107 are visible to storage system(s) 106 and 108, and the storage devices of storage system 108 are visible to storage system 106 and 107) to allow for creation of virtual volumes (128, 130) by the cluster block virtualization layer 132. In a number of storage system aggregation implementations, only virtual volumes (128, 130) are exported by the cluster block virtualization layer 132 to application system(s) 102 over the storage area network 110. In some networked storage implementations, an Input/Output (I/O) request arriving at a storage system (one of 106-108) which requires data on one or more different storage systems may be forwarded to the correct storage system(s) to satisfy the I/O request. A number of technologies may be implemented to perform I/O redirection, such as proxy I/O and command forwarding. As with other block storage cluster techniques described above, in storage system aggregation, a separate cluster virtualization manager function 134 may be required to exist on at least one of the storage systems (106-108) in the storage infrastructure. Without loss of generality, said cluster virtualization manager function 134 may be distributed across the storage systems (106-108) in the cluster, thereby providing a low cost, low invasiveness implementation of the storage management function.

Block storage volumes may be spread across multiple storage systems (106-108). Also, application system(s) 102 may access data on any storage system in the cluster. Still further, the virtual volumes (128, 130) may provide a common block address space across all storage nodes/storage systems (106-108).

Figure 2:
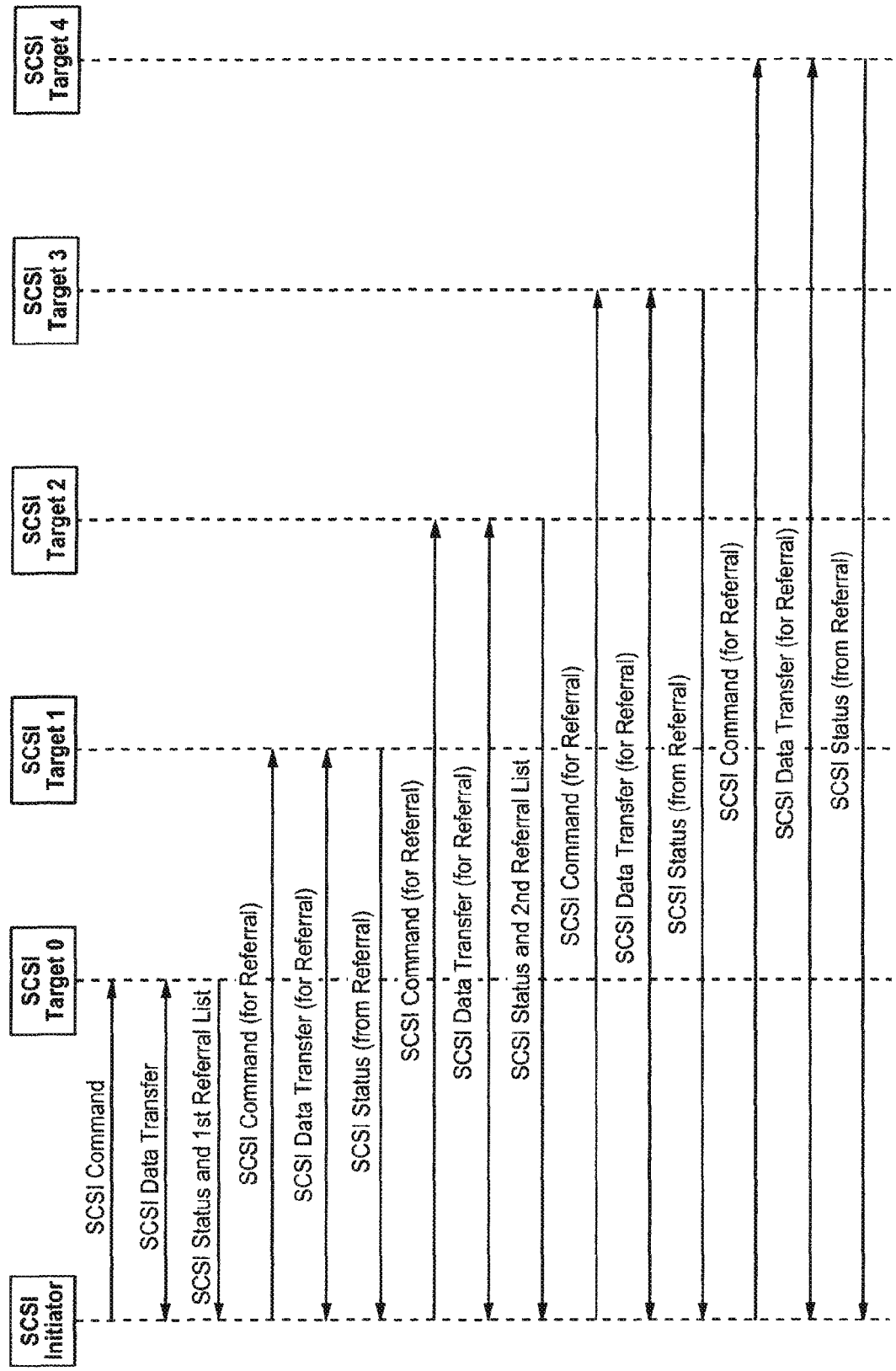
FIG. 2 is a block diagram schematic of a SCSI command/response remote procedure call with referral, as implemented by/in accordance with the present disclosure.

A SCSI referral technique/method is provided for use with a networked storage implementation/system, such as said implementation/system 100 illustrated in FIG. 1. Referring generally to FIG. 3, a method for data transfer via a networked storage implementation (ex.—a method for communication between an initiator system/initiator and a block storage cluster) in accordance with an exemplary embodiment of the present invention is shown. For example, the method may implement techniques for block storage clustering using a storage protocol command and reply sequence (ex.—such as a SCSI command/response remote procedure call model) as described below (and as shown in FIGS. 2 and 3). In a current embodiment of the present invention, the method 300 includes the step of issuing a command to a first data storage system for addressing a set of data and at least one of a first referral response including a referral to at least a second data storage system or at least a first subset of the set of data and the first referral response including the referral to the at least the second data storage system 302. For example, a block storage cluster may include at least the first data storage system 106, the second data storage system 108, and a third data storage system 107, each communicatively coupled with/including physical storage device(s) 126. The first data storage system 106 may include a first subset of the set of data. The first referral response may include at least one referral to another data storage system including further subsets of the set of data (ex.—such as second data storage system 108). The command may be transmitted by an initiator/initiator system/host/server 102 to the first data storage system 106 (ex.—a target system/target) via a storage area network 110. In exemplary embodiments, the command may be an I/O request, such as a request for data (ex.—read request). In further embodiments, the target may be any storage system in the block storage cluster and the command may be sent using any port (ex.—a port of SCSI Target 0, as shown in FIG. 2) on any prospective target storage system in the block storage cluster. The command may be a SCSI command, the initiator/initiator system 102 may be a SCSI initiator, and the target (ex.—first storage system 106) may be a SCSI target.

In additional embodiments, when sent over the storage area network 110/network transport, the command may be transmitted on an established initiator and target association (ex.—an I_T Nexus). In SCSI protocol, the I_T Nexus between the initiator and target may be established between a SCSI port on the initiator (ex.—a SCSI port of the server/application system 102) and a SCSI port on the target (ex.—a SCSI port of the first storage system 106). A block storage cluster with multiple storage systems may provide a unique port identifier for each port on all storage systems in the cluster. In addition, each SCSI command may identify the data to be transferred by its starting address and length in the volume's logical block address space.

In exemplary embodiments, the method 300 may further include the step of accessing the at least one of the first referral response including the referral to the at least the second data storage system or the at least the first subset of the set of data and the first referral response including the referral to the at least the second data storage system 304. The first referral response may be transferred from the first data storage system 106 to the initiator system 102. In current embodiments of the present invention, any subset of the requested data which is stored in/resides on the storage system receiving the command (ex.—the target storage system) may be moved/transferred to or from the initiator. For instance, data may be moved between the target 106 and the initiator 102 via a series of SCSI data transfer steps over the above-mentioned/same I_T Nexus (ex.—the data stored on the first storage system 106 may be transferred to the application system/initiator system 102). In current embodiments of the present invention, data may flow in either or both directions between the initiator and target as required by the particular SCSI command. Accessing the first subset of the set of data may include receiving a status of the first data storage system 106 by the initiator system 102 to indicate completion of the transfer of the first subset. The status may be a standard SCSI status indicator.

The referral response may be transferred from the first data storage system to the initiator system when a subset of the data requested in the data request is not stored by/does not reside on the first data storage system, but is stored by/does reside on a second data storage system included in the plurality of storage systems of the block storage cluster. The referral response may provide an indication to the initiator that not all of the data requested in the original data request was transferred, the referral response may provide a referral for directing the initiator system to the second data storage system, and/or the referral response may indicate/provide an indicator to the initiator system that one or more other storage systems of the cluster (ex.—the second storage system 108) stores said portion of/remainder of the data. The referral response may be generated by the first data storage system based on data contained on the first data storage system. The referral response may include a list of referrals to one or more other storage systems/cluster nodes (ex.—such as the second storage system 108) of the cluster where the remainder of the requested data (ex.—remainder of the data requested in the original data request received at step 302) is located/stored.

As mentioned above, there is a referral for each additional cluster node/storage system where data must be obtained by the initiator for fulfilling the original data request. In current embodiments of the present invention, each referral of the referral list may include the following information (as shown in FIG. 4) for each storage system/node to which it is referring the initiator: a port identifier (ex.—associated with a port on a cluster node/storage system which contains at least some of the remainder of the data requested in the original data request); an offset (ex.—the logical block address of a first byte of data on its associated data storage system/storage node); and a data length (ex.—an amount of data to be transferred for the referral). For example, a data length may be the amount of data in the subset to be transferred on its associated data storage system/storage node. A data length may consist of the total amount of data in all subsets to be transferred on all descendant data storage systems/storage nodes of its associated data storage system/storage node. A second data storage system/storage node may be a descendant of a first data storage system/storage node if the second data storage system/storage node is in the referral list of the first data storage system/storage node. Further, a descendant of a second data storage system/storage node may be a descendant of a first data storage system/storage node. The absence of a referral response may indicate a data storage system/storage node has no descendant data storage systems/storage nodes. Other information needed to complete a referral, such as volume, logical unit, and target are available from the context of the command which generated the SCSI referral.

In a current embodiment of the present invention, the method 300 may further include the step of issuing a command to the second data storage system for addressing a set of data and a second referral response 306. The second data storage system 108 may include a second subset of the set of data. The second referral response may include at least one referral to another data storage system including further subsets of the set of data (ex.—such as third data storage system 107). The command may be transmitted by an initiator/initiator system/host/server 102 to the second data storage system 108 (ex.—a target system/target) via a storage area network 110. In exemplary embodiments, the command may be an I/O request, such as a request for data (ex.—read request). In further embodiments, the target may be any storage system in the block storage cluster and the command may be sent using any port (ex.—the port of SCSI Target 1, as shown in FIG. 2) on any prospective target storage system in the block storage cluster. The command may be a SCSI command, the initiator/initiator system 102 may be a SCSI initiator, and the target (ex.—second storage system 108) may be a SCSI target.

In additional embodiments, when sent over the storage area network 110/network transport, the command may be transmitted on an established initiator and target association (ex.—an I_T Nexus). In SCSI protocol, the I_T Nexus between the initiator and target may be established between a SCSI port on the initiator (ex.—a SCSI port of the server/application system 102) and a SCSI port on the target (ex.—a SCSI port of the second storage system 108). A block storage cluster with multiple storage systems may provide a unique port identifier for each port on all storage systems in the cluster. In addition, each SCSI command may identify the data to be transferred by its starting address and length in the volume's logical block address space.

In exemplary embodiments, the method 300 may further include the step of accessing the second subset of the set of data and the second referral response 308. The second referral response may be transferred from the second data storage system 108 to the initiator system 102. In current embodiments of the present invention, any subset of the requested data which is stored in/resides on the storage system receiving the command (ex.—the target storage system) may be moved/transferred to or from the initiator. For instance, data may be moved between the target 108 and the initiator 102 via a series of SCSI data transfer steps over the above-mentioned/same I_T Nexus (ex.—the data stored on the second data storage system 108 may be transferred to the application system/initiator system 102). In current embodiments of the present invention, data may flow in either or both directions between the initiator and target as required by the particular SCSI command. Accessing the second subset of the set of data may include receiving a status of the second data storage system 108 by the initiator system 102 to indicate completion of the transfer of the second subset. The status may be a standard SCSI status indicator.

The referral response may be transferred from the second data storage system to the initiator system when a subset of the data requested in the data request is not stored by/does not reside on the second data storage system, but is stored by/does reside on a third data storage system included in the plurality of storage systems of the block storage cluster. The referral response may provide an indication to the initiator that not all of the data requested in the original data request was transferred, the referral response may provide a referral for directing the initiator system to the third data storage system, and/or the referral response may indicate/provide an indicator to the initiator system that one or more other storage systems of the cluster (ex.—the third storage system 107) stores said portion of/remainder of the data. The referral response may be generated by the second data storage system based on data contained on the second data storage system. The referral response may include a list of referrals to one or more other storage systems/cluster nodes (ex.—such as the third storage system 107) of the cluster where the remainder of the requested data (ex.—remainder of the data requested in the original data request received at step 302) is located/stored. In further embodiments, the block storage protocol initiator 102 may send separate commands to all other storage systems in the cluster which hold data requested in the original request by using the ports indicated in the referral list. After all data transfers in response to commands issued based on said referrals have been completed, the block storage protocol may complete the operation by returning to its caller.

Referring generally to FIGS. 5-6, various referral lists of a data set distribution provided by the current disclosure are shown. For example, linked referral list distribution 500 has a maximum referral list length of four referrals, a total data length of 160 blocks, and each individual data storage/cluster node includes a subset of the data set of 10 blocks. In linked referral list distribution 500, an initiator system (not shown) issues a command for accessing a data set of total data length 170 blocks to a first data storage system (not shown) and receives a subset of the data set of data length 10 blocks and a referral list containing the referrals for data storage/cluster nodes 502-508. Referrals 502-506 contain the port identifiers, data offsets, and data length for the data subsets referenced by their referrals. The data storage/cluster node of referral 508 has a referral list (shown by arrow 550) containing referrals for data storage/cluster nodes 510-516. The data storage/cluster nodes of referrals 510-532 are all descendants of the data storage/cluster node of referral 508, so data length of referral 508 includes the sum of total data length of referrals 510-532 and subset data length of referral 508. Similarly, data storage/cluster node of referral 516 has a referral list (shown by arrow 551) containing referrals for data storage/cluster nodes 518-524. The data storage/cluster nodes of referrals 518-532 are all descendants of referral 516. Referrals of data storage/cluster nodes 502-506, 510-514, 518-522, and 526-532 have no descendants.

Referral list tree distribution 600 has a maximum referral list length of four referrals, a total data length of 160 blocks, and each individual data storage/cluster node includes a subset of the data set of 10 blocks. In referral list tree distribution 600, an initiator system (not shown) issues a command for accessing a data set of total data length 170 blocks to a first data storage system (not shown) and receives a subset of the data set of data length 10 blocks and a referral list containing the referrals for data storage/cluster nodes 602-608. Referrals 602-608 contain the port identifiers, data offsets, and data length for the data subsets referenced by their referrals and their descendants. The data storage/cluster nodes for referrals 602-608 all have referral lists 650-653. The data storage/cluster node of referral 608 has a referral list (shown by arrow 653) containing referrals for data storage/cluster nodes 628-632. The data storage/cluster nodes of referrals 628-632 are all descendants of the data storage/cluster node of referral 608, so data length of referral 608 includes the sum of total data length of referrals 628-632 and subset data length of referral 608. Similarly, data storage/cluster node of referral 604 has a referral list (shown by arrow 651) containing referrals for data storage/cluster nodes 616-620. The data storage/cluster nodes of referrals 616-620 are all descendants of referral 604. Referrals of data storage/cluster nodes 610-614, 616-620, 622-626, and 628-632 have no descendants.

The block storage cluster technique may be required to provide a number of attributes. For example, the block storage protocol target may be required to be distributed across all storage systems (106-108) in the cluster. Further, all ports on all storage systems in the cluster may be required to have unique port identifiers. Still further, a logical block address space for a virtual volume may be required to be common across all storage systems on which the virtual volume exists. Additionally, it may be required that the cluster block virtualization function (134) on all storage systems (106-108) be able to determine which storage system in the cluster holds which address ranges of data within virtual volumes (128, 130).

As discussed above, the method of the present invention may be implemented in block storage clusters that provide block virtualization on the storage system(s) (106-108). In exemplary embodiments, the system/method of the present invention, rather than utilizing command forwarding or proxy I/O, implements cluster block virtualization (132, 134) which indicates that data resides on other cluster nodes by completing its local data transfer with status information and a list of referrals in SCSI sense data. The status information may include a SCSI check condition.

In further embodiments, the SCSI initiator 102 may be configured to detect a new check condition, issue new SCSI commands for each referral, and track when all referrals are completed. The initiator 102 may further be configured for accumulating data retrieved via referrals across multiple initiator-target nexuses.

In the present disclosure, the methods disclosed may be implemented as sets of instructions or software readable by a device. Further, it is understood that the specific order or hierarchy of steps in the methods disclosed are examples of exemplary approaches. Based upon design preferences, it is understood that the specific order or hierarchy of steps in the method can be rearranged while remaining within the disclosed subject matter. The accompanying method claims present elements of the various steps in a sample order, and are not necessarily meant to be limited to the specific order or hierarchy presented.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

What is claimed is:

1. A method, comprising:

issuing a command to a first data storage system for addressing a set of data and at least one of a first referral response including a referral to at least a second data storage system or at least a first subset of the set of data and the first referral response including the referral to the at least the second data storage system;

accessing the at least one of the first referral response including the referral to the at least the second data storage system or the at least the first subset of the set of data and the first referral response including the referral to the at least the second data storage system;

issuing a command to the second data storage system for addressing the set of data and a second referral response including a referral to at least one of the first data storage system and a third data storage system, the second data storage system including at least a second subset of the set of data; and accessing the second subset of the set of data and the second referral response including the referral to the at least one of the first data storage system and the third data storage system;

wherein the referral to the first data storage system further includes:

a first port identifier associated with a port of the first data storage system, a first data offset of the first subset of the set of data, and a first data length for the first data storage system;

wherein the referral to the second data storage system further includes:

a second port identifier associated with a port of the second data storage system, a second data offset of the second subset of the set of data, and a second data length for the second data storage system; and wherein the referral to the third data storage system further includes:

a third port identifier associated with a port of the third data storage system, a third data offset of the third subset of the set of data, and a third data length for the third data storage system;

wherein the first data length for the first data storage system is a sum of the data length for the first subset of the set of data and data lengths for all subsets of the set of data on all descendant data storage systems in all descendant referral responses for the first data storage system;

the second data length for the second data storage system is a sum of the data length for the second subset of the set of data and data lengths for all subsets of the set of data on all descendant data storage systems in all descendant referral responses for the second data storage system; and the third data length for the third data storage system is a sum of the data length for the third subset of the set of data and data lengths for all subsets of the set of data on all descendant data storage systems in all descendant referral responses for the third data storage system.

2. The method of claim 1, the issuing a command to the first data storage system further including:

issuing a command to the first data storage system via a Small Computer System Interface (SCSI) input/output (I/O) request command, the first data storage system is a SCSI storage system and the second data storage system is a SCSI storage system; and the issuing a command to the second data storage system further including:

issuing a command to the second data storage system via a SCSI I/O request command, the second data storage system is a SCSI storage system and the third data storage system is a SCSI storage system.

3. The method of claim 1, wherein the referral to the first data storage system further includes:

a first port identifier, the first port identifier identifying a port of the first data storage system via which the first data storage system is accessible;

wherein the referral to the second data storage system further includes:

a second port identifier, the second port identifier identifying a port of the second data storage system via which the second data storage system is accessible; and wherein the referral to the third data storage system further includes:

a third port identifier, the third port identifier identifying a port of the third data storage system via which the third data storage system is accessible.

4. A method, comprising:

issuing a command to a first data storage system for addressing a set of data and at least one of a first referral response including a referral to at least a second data storage system or at least a first subset of the set of data and the first referral response including the referral to the at least the second data storage system;

accessing the at least one of the first referral response including the referral to the at least the second data storage system or the at least the first subset of the set of data and the first referral response including the referral to the at least the second data storage system;

issuing a command to the second data storage system for addressing the set of data and a second referral response including a referral to at least one of the first data storage system and a third data storage system, the second data storage system including at least a second subset of the set of data; and accessing the second subset of the set of data and the second referral response including the referral to the at least one of the first data storage system and the third data storage system;

wherein the accessing the at least one of the first referral response including the referral to the at least the second data storage system or the at least the first subset of the set of data and the first referral response including the referral to the at least the second data storage system further includes:

receiving a status for the first data storage system and the first referral response including the referral to the at least the second data storage system; and wherein accessing the second subset of the set of data further includes:

receiving a status for the second data storage system and the second referral response including the referral to the at least one of the first data storage system or the third data storage system;

wherein the accessing the first subset of the set of data is completed via the first data storage system transferring a status for the first data storage system; and wherein the accessing the second subset of the set of data is completed via the second data storage system transferring a status for the second data storage system.

5. A storage cluster, comprising:

a first data storage system for at least one of generating a first referral response or storing a first subset of a set of data and generating the first referral response; and a second data storage system for storing a second subset of the set of data and generating a second referral response;

wherein the first referral response includes a referral to at least the second data storage system and the second referral response includes a referral to at least one of the first data storage system and a third data storage system;

wherein the referral to the first data storage system further includes:

a first port identifier associated with a port of the first data storage system, a first data offset of the first subset of the set of data, and a first data length for the first data storage system;

wherein the referral to the second data storage system further includes:

a second port identifier associated with a port of the second data storage system, a second data offset of the second subset of the set of data, and a second data length for the second data storage system; and wherein the referral to the third data storage system further includes:

a third port identifier associated with a port of the third data storage system, a third data offset of the third subset of the set of data, and a third data length for the third data storage system;

wherein the first data length for the first data storage system is the sum of the data length for the first subset of the set of data and data lengths for all subsets of the set of data on all descendant data storage systems in all descendant referral responses for the first data storage system;

the second data length for the second data storage system is the sum of the data length for the second subset of the set of data and data lengths for all subsets of the set of data on all descendant data storage systems in all descendant referral responses for the second data storage system; and the third data length for the third data storage system is the sum of the data length for the third subset of the set of data and data lengths for all subsets of the set of data on all descendant data storage systems in all descendant referral responses for the third data storage system.

6. The storage cluster of claim 5, wherein the first data storage system is a SCSI storage system;

wherein the second data storage system is a SCSI storage system; and wherein the third data storage system is a SCSI storage system.

7. The storage cluster of claim 5, wherein the referral to the first data storage system further includes:
 a first port identifier, the first port identifier identifying a port of the first data storage system via which the first data storage system is accessible;
 wherein the referral to the second data storage system further includes:
 a second port identifier, the second port identifier identifying a port of the second data storage system via which the second data storage system is accessible; and
 wherein the referral to the third data storage system further includes:
 a third port identifier, the third port identifier identifying a port of the third data storage system via which the third data storage system is accessible.

* * * * *